United States Patent
Zhao et al.

(10) Patent No.: US 10,876,850 B2
(45) Date of Patent: Dec. 29, 2020

(54) TRAJECTORY MODELING FOR CONTEXTUAL RECOMMENDATION

(71) Applicant: INTERNATIONAL BUSINESS MACHINES CORPORATION, Armonk, NY (US)

(72) Inventors: Shiwan Zhao, Beijing (CN); Zhi Hu Wang, Beijing (CN); Changhua Sun, Beijing (CN); Zhong Su, Beijing (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 109 days.

(21) Appl. No.: 16/172,162

(22) Filed: Oct. 26, 2018

(65) Prior Publication Data

US 2020/0132485 A1 Apr. 30, 2020

(51) Int. Cl.
*G01C 21/34* (2006.01)
*G06N 3/04* (2006.01)

(52) U.S. Cl.
CPC ..... *G01C 21/3484* (2013.01); *G01C 21/3476* (2013.01); *G06N 3/0445* (2013.01)

(58) Field of Classification Search
None
See application file for complete search history.

(56) References Cited

U.S. PATENT DOCUMENTS 8,645,366 B1 2/2014 Acharya
9,282,161 B1 3/2016 Hill

2013/0024203 A1 1/2013 Flores et al.
2018/0049001 A1* 2/2018 Volozh ................. G06N 3/0445
(Continued)

FOREIGN PATENT DOCUMENTS

KR 20140093772 7/2014

OTHER PUBLICATIONS

Xia et al., "Attention-based Recurrent Neural Network for Location Recommendation", 12th International Conference on Intelligent Systems and Knowledge Engineering (ISKE), Nanjing, China, Nov. 24-26, 2017, p. 1-6 (Year: 2017).*

(Continued)

*Primary Examiner* — Tamara L Weber
(74) *Attorney, Agent, or Firm* — Tutunjian & Bitetto, P.C.; Joseph Petrokaitis

(57) ABSTRACT

A computer-implemented method, computer program product, and computer processing system are provided for computing a trajectory-based Point of Interest recommendation. The method includes generating, by a processor device, a set of embeddings. Each of the embeddings in the set relates to a respective different trajectory contextual element of a user trajectory. The method further includes computing, by the processor device based on the set of embeddings, an activity representation that includes a set of POI candidate embeddings. The method also includes composing, by the processor device, a stop embedding based on the activity representation and the embeddings in the set and corresponding to a given stop in the user trajectory. The method additionally includes computing, by the processor device, the trajectory-based POI recommendation using an attention-based, user-specific, multi-stop trajectory, Recurrent Neural Network (RNN) model applied to the stop embedding.

18 Claims, 9 Drawing Sheets

(56) References Cited

U.S. PATENT DOCUMENTS

2019/0354858 A1* 11/2019 Chrzanowski ....... G06N 3/0454
2020/0011676 A1* 1/2020 Ye .......................... G06F 16/29

OTHER PUBLICATIONS

Liu et al., "Unified Point-of-Interest Recommendation with Temporal Interval Assessment", KDD '16, Aug. 2016, 10 pages.
Zenger, Geoffrey Benjamin, "Trajectory-Based Point of Interest Recommendation", Simon Fraser University, a Thesis submitted in partial fulfillment of the requirements for the degree of Master of Science in the School of Computing Science, Dec. 2009, 112 pages.
Zhao et al., "A time-aware trajectory embedding model for next-location recommendation", Springer-Verlag, Oct. 2017, pp. 559-579.

* cited by examiner

TRAJECTORY MODELING FOR CONTEXTUAL RECOMMENDATION

BACKGROUND

Technical Field

The present invention generally relates to machine learning, and more particularly to trajectory modeling for contextual recommendation.

Description of the Related Art

Location based Point Of Interest (POI) recommendation is very popular when a user is moving (e.g., the user is in a moving car). However, it is hard to infer the real intention of the user to make accurate recommendations. For example, Amy goes to a shopping mall. Amy may want to do any of the following: (1) have dinner with her family; (2) have dinner with her colleagues; (3) watch a movie; (4) take her daughter for the dancing class; (5) and so forth. However, it is very difficult to infer the user's intention, or even narrow down the scope of the user's intention for that matter. Hence, there is a need for an improved way to infer the user's intention in such a scenario.

SUMMARY

According to an aspect of the present invention, a computer-implemented method is provided for computing a trajectory-based Point of Interest recommendation. The method includes generating, by a processor device, a set of embeddings. Each of the embeddings in the set relates to a respective different trajectory contextual element of a user trajectory. The method further includes computing, by the processor device based on the set of embeddings, an activity representation that includes a set of POI candidate embeddings. The method also includes composing, by the processor device, a stop embedding based on the activity representation and the embeddings in the set and corresponding to a given stop in the user trajectory. The method additionally includes computing, by the processor device, the trajectory-based POI recommendation using an attention-based, user-specific, multi-stop trajectory, Recurrent Neural Network (RNN) model applied to the stop embedding.

According to another aspect of the present invention, a computer program product is provided for computing a trajectory-based Point of Interest recommendation. The computer program product includes a non-transitory computer readable storage medium having program instructions embodied therewith. The program instructions are executable by a computer to cause the computer to perform a method. The method includes generating, by a processor device, a set of embeddings. Each of the embeddings in the set relates to a respective different trajectory contextual element of a user trajectory. The method further includes computing, by the processor device based on the set of embeddings, an activity representation that includes a set of POI candidate embeddings. The method also includes composing, by the processor device, a stop embedding based on the activity representation and the embeddings in the set and corresponding to a given stop in the user trajectory. The method additionally includes computing, by the processor device, the trajectory-based POI recommendation using an attention-based, user-specific, multi-stop trajectory, Recurrent Neural Network (RNN) model applied to the stop embedding.

According to yet another aspect of the present invention, a computer processing system is provided for computing a trajectory-based Point of Interest recommendation. The computer processing system includes a memory for storing program code. The computer processing system further includes a processor device for running the program code to generate a set of embeddings. Each of the embeddings in the set relates to a respective different trajectory contextual element of a user trajectory. The processor device further runs the program code to compute, based on the set of embeddings, an activity representation that includes a set of POI candidate embeddings. The processor device also runs the program code to compose a stop embedding based on the activity representation and the embeddings in the set and corresponding to a given stop in the user trajectory. The processor device additionally runs the program code to compute the trajectory-based POI recommendation using an attention-based, user-specific, multi-stop trajectory, Recurrent Neural Network (RNN) model applied to the stop embedding.

These and other features and advantages will become apparent from the following detailed description of illustrative embodiments thereof, which is to be read in connection with the accompanying drawings.

BRIEF DESCRIPTION OF THE DRAWINGS

The following description will provide details of preferred embodiments with reference to the following figures wherein.

DETAILED DESCRIPTION

The present invention is directed to trajectory modeling for contextual recommendation.

In an embodiment, a novel recommendation framework is provided to model a user by both static preference and dynamic trajectory context. First, attention based sequence modeling is provided for trajectory. Second, a novel approach is provided for attention stop embedding.

As used herein, the term "stop embedding" refers to an embedding for a contextual element relating to, and thus capable of affecting, a user's trajectory. In one or more embodiments, the stop embedding particularly relates to a contextual element relating to a stop point, that is, a recommended POI, in a user's trajectory. Examples include time (e.g., take a lunch break at 12:00 PM), weather (e.g., seek shelter if the rain makes seeing very difficult while driving or if it begins hailing), holiday or not (if its Christmas, stop at St. Patrick's Cathedral), and other examples mentioned hereinafter for the sake of illustration.

In an embodiment, the present invention infers a dynamic user intention to some extent by trajectory modeling. In an embodiment, a novel recommendation framework is provided to model a user by both static preferences and dynamic trajectory context. First, a novel approach is provided for stop embedding by considering date/time, during of stop, weather, and so forth, and the POI attribute is modeled using an attention mechanism. Second, the trajectory sequence is modeled by using an attentional Recurrent Neural Networks. Finally, the static user preference and dynamic trajectory context are combined to make an accurate Point Of Interest (POI) recommendation.

Hence, in various embodiments, the present invention can involve performing information filtering, where the information being filtered is trajectory information of a user, in order to make predictions for the user based on the user's trajectory.

Figure 1:
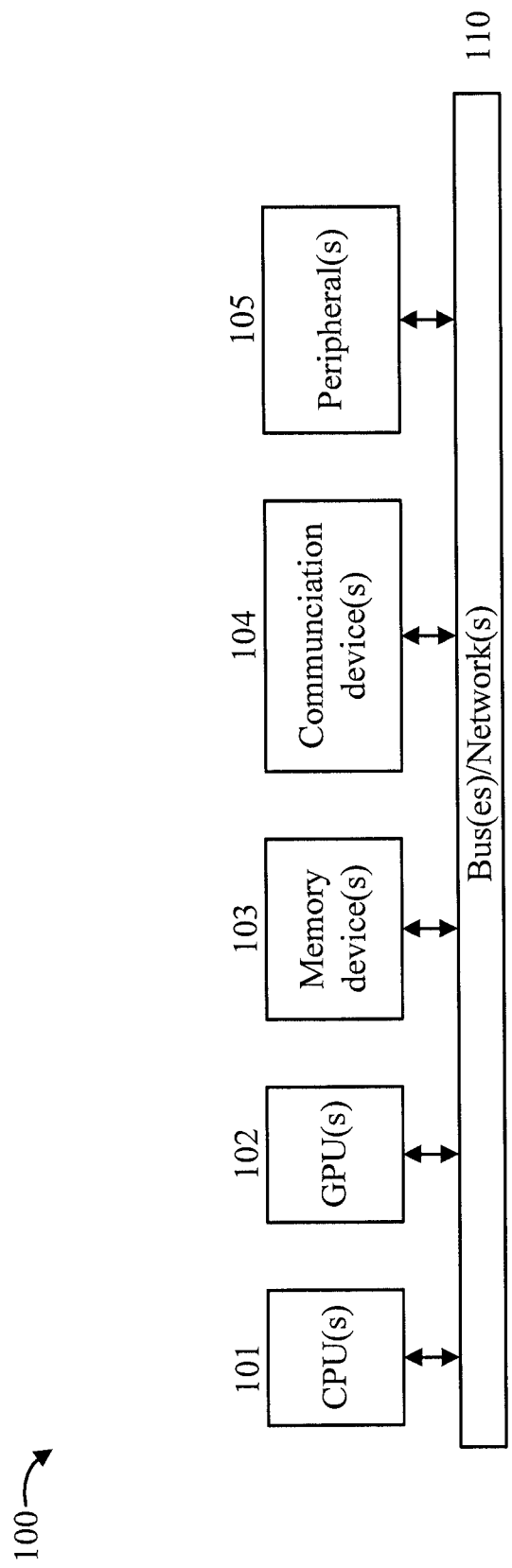
FIG. 1 is a block diagram showing an exemplary processing system to which the present invention may be applied, in accordance with an embodiment of the present invention.

FIG. 1 is a block diagram showing an exemplary processing system 100 to which the present invention may be applied, in accordance with an embodiment of the present invention. The processing system 100 includes a set of processing units (e.g., CPUs) 101, a set of GPUs 102, a set of memory devices 103, a set of communication devices 104, and set of peripherals 105. The CPUs 101 can be single or multi-core CPUs. The GPUs 102 can be single or multi-core GPUs. The one or more memory devices 103 can include caches, RAMs, ROMs, and other memories (flash, optical, magnetic, etc.). The communication devices 104 can include wireless and/or wired communication devices (e.g., network (e.g., WIFI, etc.) adapters, etc.). The peripherals 105 can include a display device, a user input device, a printer, an imaging device, and so forth. Elements of processing system 100 are connected by one or more buses or networks (collectively denoted by the figure reference numeral 110).

Figure 7:
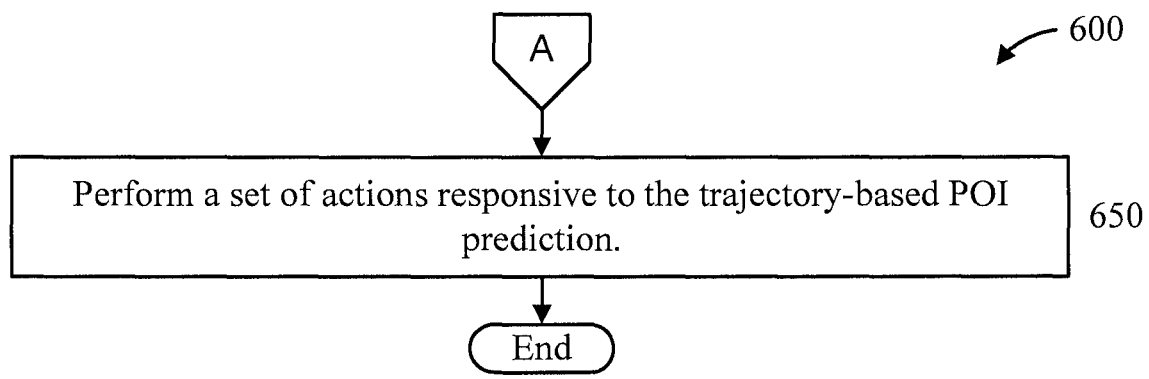

Of course, the processing system 100 may also include other elements (not shown), as readily contemplated by one of skill in the art, as well as omit certain elements. For example, various other input devices and/or output devices can be included in processing system 100, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. Further, in another embodiment, a cloud configuration can be used (e.g., see FIGS. 7-8). These and other variations of the processing system 100 are readily contemplated by one of ordinary skill in the art given the teachings of the present invention provided herein.

Moreover, it is to be appreciated that various figures as described below with respect to various elements and steps relating to the present invention that may be implemented, in whole or in part, by one or more of the elements of system 100.

Figure 2:
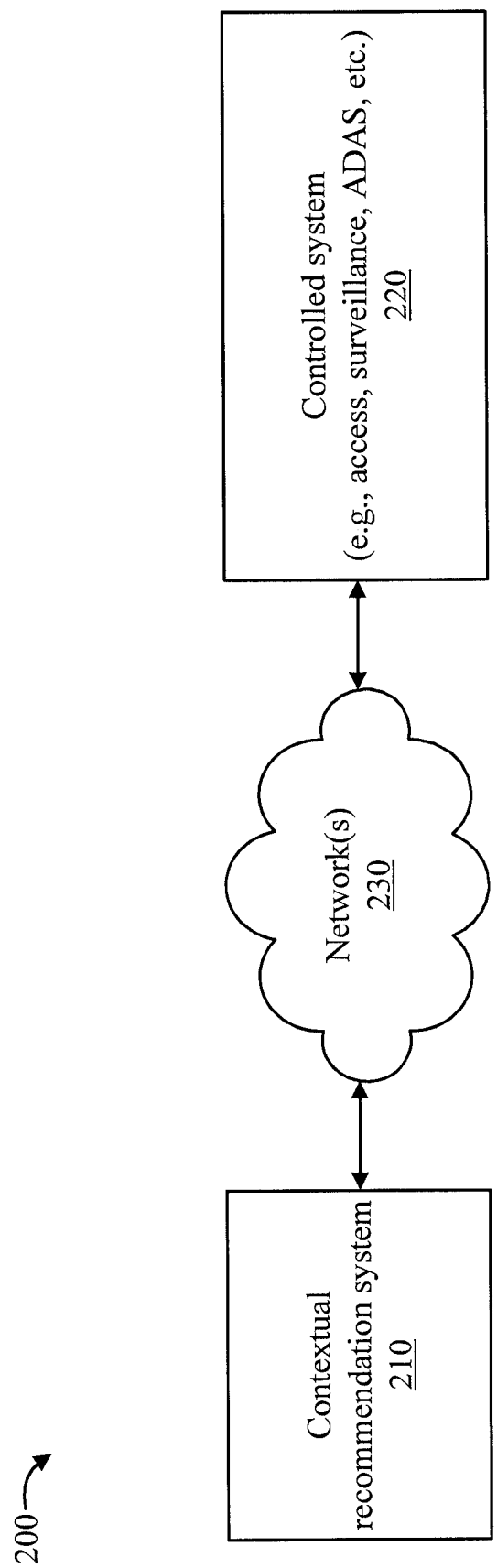
FIG. 2 is a block diagram showing an exemplary environment to which the present invention can be applied, in accordance with an embodiment of the present invention.

FIG. 2 is a block diagram showing an exemplary environment 200 to which the present invention can be applied, in accordance with an embodiment of the present invention.

The environment 200 includes a controlled system 220 and a contextual recommendation system 210. The contextual recommendation system 210 and the controlled system 220 are configured to enable communications therebetween. For example, transceivers and/or other types of communication devices including wireless, wired, and combinations thereof can be used. In an embodiment, communication between the contextual recommendation system 210 and the controlled system 220 can be performed over one or more networks, collectively denoted by the figure reference numeral 230. The communication can include, but is not limited to, trajectory or user related data from the controlled system 220, and predictions and action initiation control signals from the contextual recommendation system 210. The controlled system 220 can be any type of processor-based system such as, for example, but not limited to, an access system, a surveillance system, an Advanced Driver-Assistance System (ADAS), and so forth.

The controlled system 220 provides data (e.g., trajectory or user related data) to the contextual recommendation system 210 which uses the data for learning and to make predictions (forecasts).

The controlled system 220 can be controlled based on a prediction generated by the contextual recommendation system 210. For example, based on a trajectory of an intruder, a surveillance system being controlled could lock or unlock one or more doors in order to secure someone in a certain place (holding area) and/or guide them to a safe place (safe room) and/or restrict them from a restricted place and/or so forth. Verbal (from a speaker) or displayed (on a display device) instructions could be provided along with the locking and/or unlocking of doors (or other actions) in order to guide a person. As a further example, a vehicle can be controlled (braking, steering, accelerating, and so forth) to avoid an obstacle that is predicted to be in a car's current trajectory responsive to a prediction. It is to be appreciated that the preceding actions are merely illustrative and, thus, other actions can also be performed depending upon the implementation, as readily appreciated by one of ordinary skill in the art given the teachings of the present invention provided herein, while maintaining the spirit of the present invention.

In an embodiment, the contextual recommendation system 210 can be implemented as a node in a cloud-computing arrangement. In an embodiment, a single contextual recommendation system 210 can be assigned to a single controlled system or to multiple controlled systems e.g., different robots in an assembly line, and so forth). These and other configurations of the elements of environment 200 are readily determined by one of ordinary skill in the art given the teachings of the present invention provided herein, while maintaining the spirit of the present invention.

Figure 3:
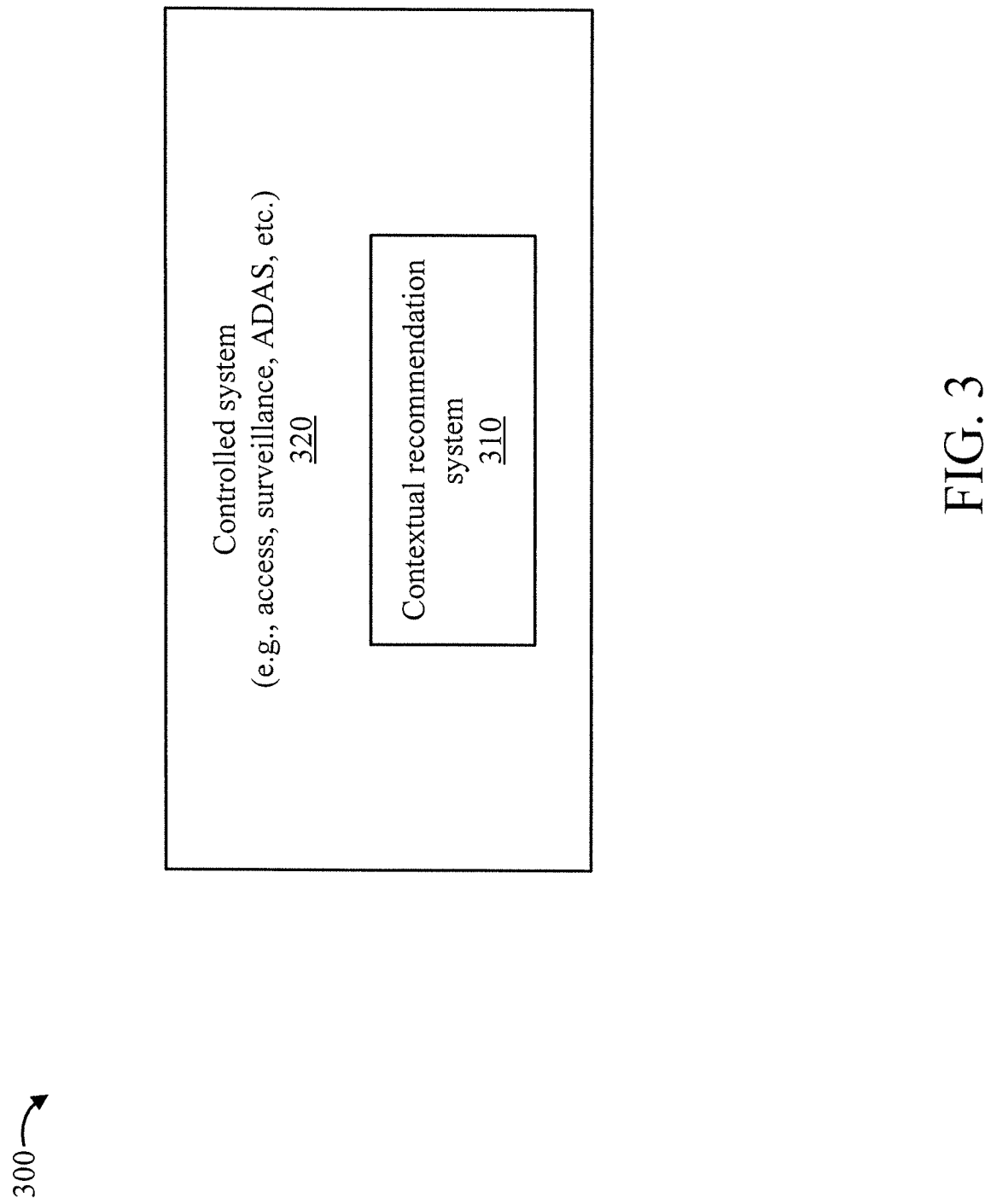
FIG. 3 is a block diagram showing another exemplary environment to which the present invention can be applied, in accordance with an embodiment of the present invention.

FIG. 3 is a block diagram showing another exemplary environment 300 to which the present invention can be applied, in accordance with an embodiment of the present invention.

The environment 300 includes a controlled system 320 that, in turn, includes a contextual recommendation system 310. One or more communication buses and/or other devices can be used to facilitate inter-system, as well as intra-system, communication. The controlled system 320 can be any type of processor-based system such as, for example, but not limited to, an access system, a surveillance system, an Advanced Driver-Assistance System (ADAS), and so forth.

Other than system 310 being included in system 320, operations of these elements in environments 200 and 300 are similar. Accordingly, elements 310 and 320 are not described in further detail relative to FIG. 3 for the sake of brevity, with the reader respectively directed to the descriptions of elements 210 and 220 relative to environment 200 of FIG. 2 given the common functions of these elements in the two environments 200 and 300.

An overview with example will now be given regarding various aspects of the present invention, following by a block diagram (FIG. 4) showing an exemplary recommendation system, a block diagram (FIG. 5) showing an exemplary stop embedding used by the recommendation system, and a flow diagram (FIG. 6) describing an exemplary method in accordance with an embodiment of the present invention.

The context of the user implies the user intention to some extent. The challenge is how to model the context of a user performing an action such as driving a car or any other action where the user is moving and therefore has a trajectory associated therewith. To that end, it has been determined that the trajectory history of the user includes rich information.

As example will now be provided of trajectory history to which the present invention can be applied, in accordance with an embodiment of the present invention.

Amy's trajectory history on Monday before arriving at a shopping mall is as follows: after work, Amy drove to school, picked up her daughter, and then drove to the shopping mall. It can be inferred that Amy's daughter has dancing class on Monday, she is most likely to have dinner with her daughter, so the present invention recommends fast food to Amy.

However, only the location of each stop of the trajectory is known. Exactly what the user does at each stop is not known. How to semantically model the trajectory is a big challenge, due to at least the following: (i) in each stop, there are many POI candidates; (2) different dates/times; and (3) weather.

In accordance with various embodiments of the present invention, a novel recommendation framework is provided to model a user by both static preferences and dynamic trajectory context.

In the recommendation framework, an attention based sequence model is created for trajectory. Moreover, in the recommendation framework, a novel approach for attention stop embedding is employed.

Hence, one or more embodiments of the present invention involve user modeling with both static preference and dynamic trajectory context.

To that end, the present invention employs the following: (a) attention based sequence modeling for trajectory; and (b) advanced stop embedding.

Examples of advanced stop embedding can include POI type embedding, where the POI types are embedded into vectors. Exemplary POI types can include, for example, but are not limited to, time embedding; time slot embedding (24/7); holiday or not; weather; duration of stay; gap between two consecutive stops; and so forth.

Thereafter, POI type selection is performed, where the appropriate POI types are selected by attention according to the context information.

Figure 4:
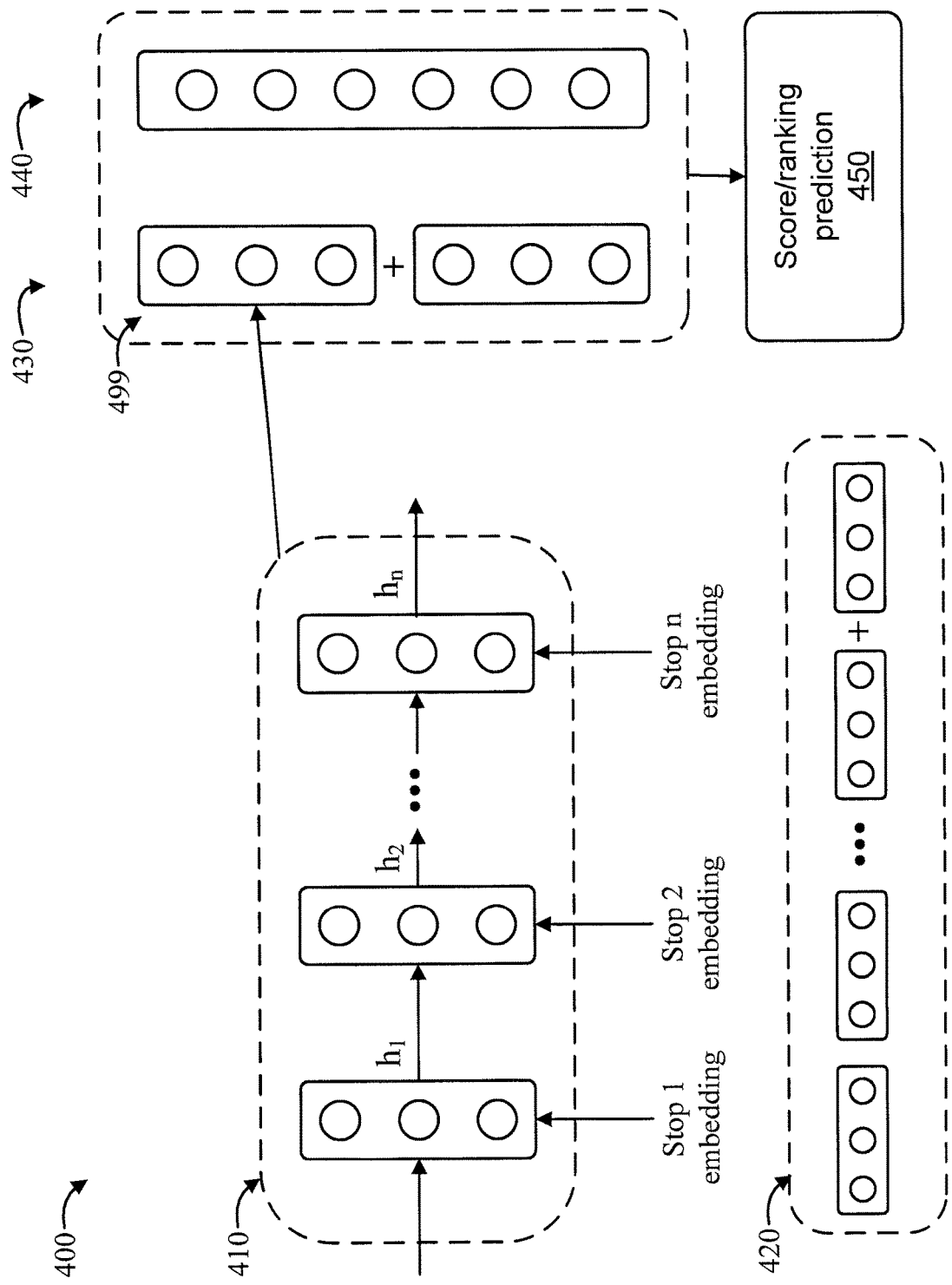
FIG. 4 is a block diagram showing an exemplary recommendation framework, in accordance with an embodiment of the present invention.

FIG. 4 is a block diagram showing an exemplary recommendation framework 400, in accordance with an embodiment of the present invention.

The recommendation framework 400 includes a RNN 410 for multi-stop trajectory, a stop embedding 420, a static user embedding 430, an item embedding 440, and a score/ranking prediction 450.

The RNN 410 includes various hidden layers $h_1$ through $h_n$. The stop embedding 420 includes stop 1 embedding through stop n embedding. Each of the hidden layers $h_1$ through $h_n$ receives a respective one of the stop embeddings (that is, stop 1 embedding through stop n embedding).

The RNN 410 provides an attention over the hidden layers $h_1$ through $h_n$. That is, the RNN adjusts the weights of contextual elements relating to user trajectory based on the hidden layers, which can involve activation functions layers and various pooling layers in order to assign weights based on attention. Accordingly, the static user embedding includes an activity representation 499. The basic assumption in using attention is that only selective parts of input features are information for the end machine learning tasks. It is these selective parts that will be weighted to indicate their relative importance as compared to other parts of the input features. In this way, the most informative input features are used to make a final POI recommendation. As such, the weights assigned by the various layers can be considered as attention weights.

In an embodiment, the score/ranking prediction 450 can be provided using matrix factorization and/or Bayesian Personalized Ranking (BPR) techniques. Given the user and item vectors/representations, the predicted score of the user towards the item is computed by dot product of the user and item vectors. In an embodiment of the present invention, the user vector is the concatenation of the dynamic user profile (computed from RNN) and the static user profile (randomly initialized), and the item vector is a randomly initialized item embedding. With the predicted score, we can compute the loss function and update the parameters by back propagation.

Figure 5:
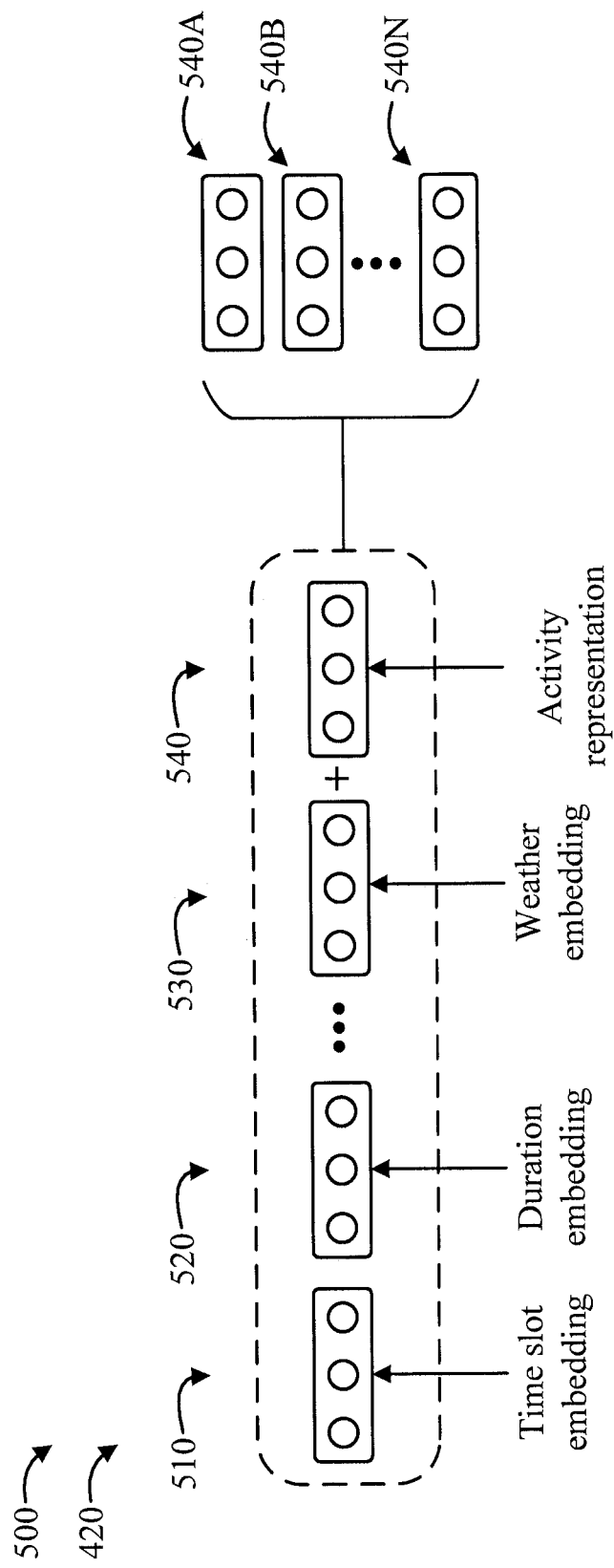
FIG. 5 is a block diagram further showing an exemplary portion of the stop embedding of the recommendation framework of FIG. 4, in accordance with an embodiment of the present invention.

FIG. 5 is a block diagram further showing an exemplary portion 500 of the stop embedding 420 of the recommendation framework 400 of FIG. 4, in accordance with an embodiment of the present invention.

In particular, FIG. 5 shows any of stop 1 embedding through stop n embedding.

The portion 500 includes a time slot embedding 510, a duration embedding 520, a weather embedding 530, and an activity representation 540.

The activity representation 540 includes multiple POI candidate embeddings 540A-540N. This is one of the key points of the present invention. For each stop, we only know the GPS location of the stop, but we do not know what activity or activities happen in this GPS location, so that we need to somewhat infer what the user did in this location during the stop. We know all the POI candidates around this location, for example, restaurant, gym, shopping mall, etc. By leveraging an attention mechanism, we can infer the possibility of each POI candidate which was involved during the stop. Then we use the attention weighted average of the POI candidates to represent the activity that happened in this stop.

For POI type i, the following applies:

$$a_i = u^T \tanh(W_1 e_i^{poi} + W_2 e_t^{time} + W_3 e_t^{weather} + W_4 h_{t-1})$$

$$\alpha_i = \frac{\exp(a_i)}{\sum_k \exp(a_k)} \quad e_t^{stop} = \sum_{i=1}^{C_t} \alpha_i e_i^{poi}$$

where $W_1 \in R^{d \times d1}$, $W_2 \in R^{d \times d2}$, $W_3 \in R^{d \times d3}$, $W_4 \in R^{d \times d}$ and $u \in R^d$ are the weight matrices, d1, d2, d3 are the size of embedding of poi, time, and weather respectively, $\alpha_i$ is computed to measure the alignment between the POI candidate i and the context (time, weather, previous RNN state $h_{t-1}$, etc.), $\alpha_i$ denotes the normalized attention weight. $e_i$ denotes the embedding of the POI candidate i, $e_t$ denotes the embedding of context (e.g., time, weather, etc.) of stop t, $e_t^{stop}$ denotes the activity representation in stop t, and $C_t$ denotes the total number of POI candidates in stop t.

Figure 6:
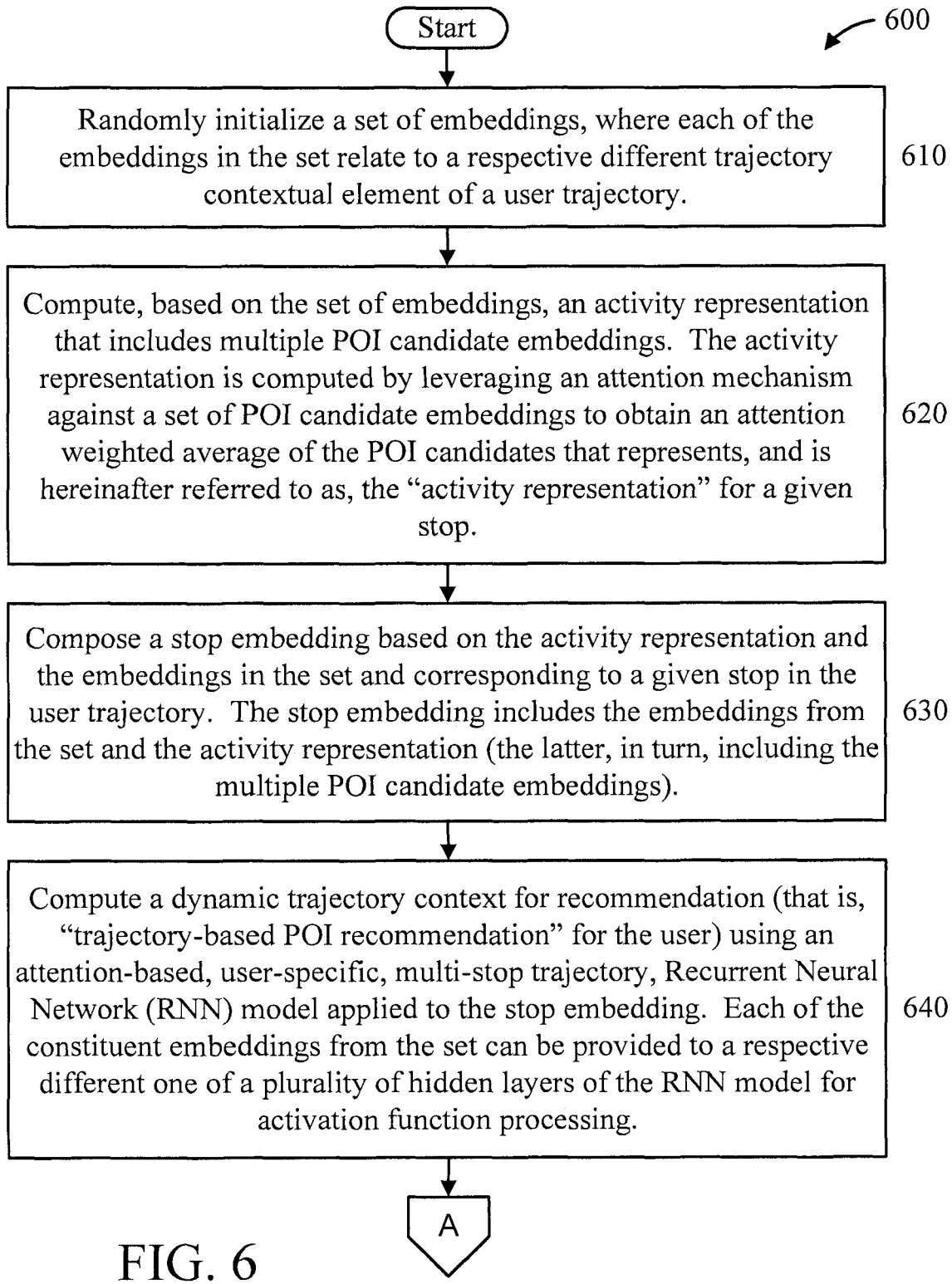
FIGS. 6-7 are flow diagrams showing an exemplary method for trajectory modeling for contextual POI recommendation, in accordance with an embodiment of the present invention.

FIG. 6 is a flow diagram showing an exemplary method 600 for trajectory modeling for contextual POI recommendation, in accordance with an embodiment of the present invention.

At block 610, randomly initialize a set of embeddings, where each of the embeddings in the set relate to a respective different trajectory contextual element of a user trajectory. In an embodiment, the set of embeddings (that is, the different trajectory contextual elements) can include, for example, but are not limited to, time, weather, static user, and item. It is to be appreciated that the embeddings that are used depend upon the implementation. Hence, it is to be further appreciated that the present invention is not limited to solely the preceding embeddings and thus other embeddings can also be used, while maintaining the spirit of the present invention.

At block 620, compute, based on the set of embeddings, an activity representation that includes multiple POI candidate embeddings. The activity representation is computed by leveraging an attention mechanism against a set of POI candidate embeddings to obtain an attention weighted average of the POI candidates that represents, and is hereinafter referred to as, the "activity representation" for a given stop. The set of POI candidate embeddings are already known for a given stop. The set of POI candidate embeddings for a given stop can be pre-derived from historical data for the user and/or other users.

At block 630, compose a stop embedding based on the activity representation and the embeddings in the set and corresponding to a given stop in the user trajectory. The stop embedding includes the embeddings from the set and the activity representation (the latter, in turn, including the multiple POI candidate embeddings).

At block 640, compute a dynamic trajectory context for recommendation using an attention-based, user-specific, multi-stop trajectory, Recurrent Neural Network (RNN) model (hereinafter "RNN model" in short) applied to the stop embedding. In particular, each of the constituent embeddings from the set (initialized at block 610) can be provided to a respective different one of a plurality of hidden layers of the RNN model for activation function processing. The dynamic trajectory context for recommendation can be considered as, and is hereinafter referred to as a "trajectory-based POI recommendation" for the user.

At block 650, perform a set of actions responsive to the trajectory-based POI prediction. As is evident to one of ordinary skill in the art, the actions will be dependent upon the implementation as well as the operating environment in which the present invention is used. The actions can involve providing an indication in a vehicle of a POI corresponding to the trajectory-based POI recommendation. For example, in an ADAS, the action can involve providing an indication to the user, visually, audibly, and/or in a tactile manner (e.g., vibrating the steering wheel, vibrating the seat, pulsing the brakes, etc.). In an embodiment, the action can involve providing directions to the user of the POI location. In an embodiment, an autonomous driving mode may be engaged to automatically drive a vehicle in which the user is in to a POI corresponding to the trajectory-based POI recommendation. In an embodiment, a detailed map of the POI corresponding to the trajectory-based POI recommendation can be downloaded to a user device (i.e., a mobile phone). In an embodiment, the POI can be highlighted on a downloaded map or a map resident in a motor vehicle to aid the user in readily locating the POI. It is to be appreciated that the preceding actions are merely illustrative and, thus, other actions can also be performed as readily appreciated by one of ordinary skill in the art, given the teachings of the present invention provided herein, while maintaining the spirit of the present invention.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 8:
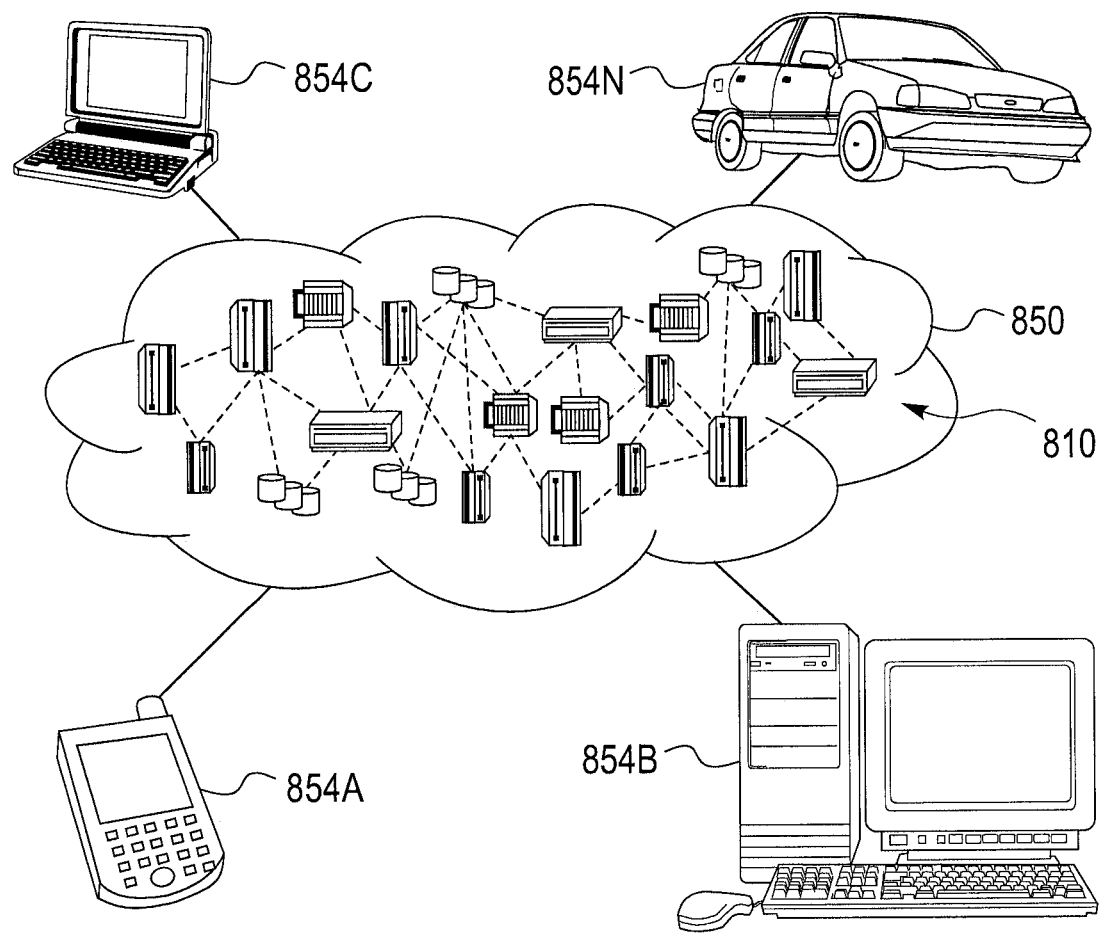
FIG. 8 is a block diagram showing an illustrative cloud computing environment having one or more cloud computing nodes with which local computing devices used by cloud consumers communicate, in accordance with an embodiment of the present invention.

Referring now to FIG. 8, illustrative cloud computing environment 850 is depicted. As shown, cloud computing environment 850 includes one or more cloud computing nodes 810 with which local computing devices used by cloud consumers, such as, for example, personal digital assistant (PDA) or cellular telephone 854A, desktop computer 854B, laptop computer 854C, and/or automobile computer system 854N may communicate. Nodes 810 may communicate with one another. They may be grouped (not shown) physically or virtually, in one or more networks, such as Private, Community, Public, or Hybrid clouds as described hereinabove, or a combination thereof. This allows cloud computing environment 850 to offer infrastructure, platforms and/or software as services for which a cloud consumer does not need to maintain resources on a local computing device. It is understood that the types of computing devices 854A-N shown in FIG. 8 are intended to be illustrative only and that computing nodes 810 and cloud computing environment 850 can communicate with any type of computerized device over any type of network and/or network addressable connection (e.g., using a web browser).

Figure 9:
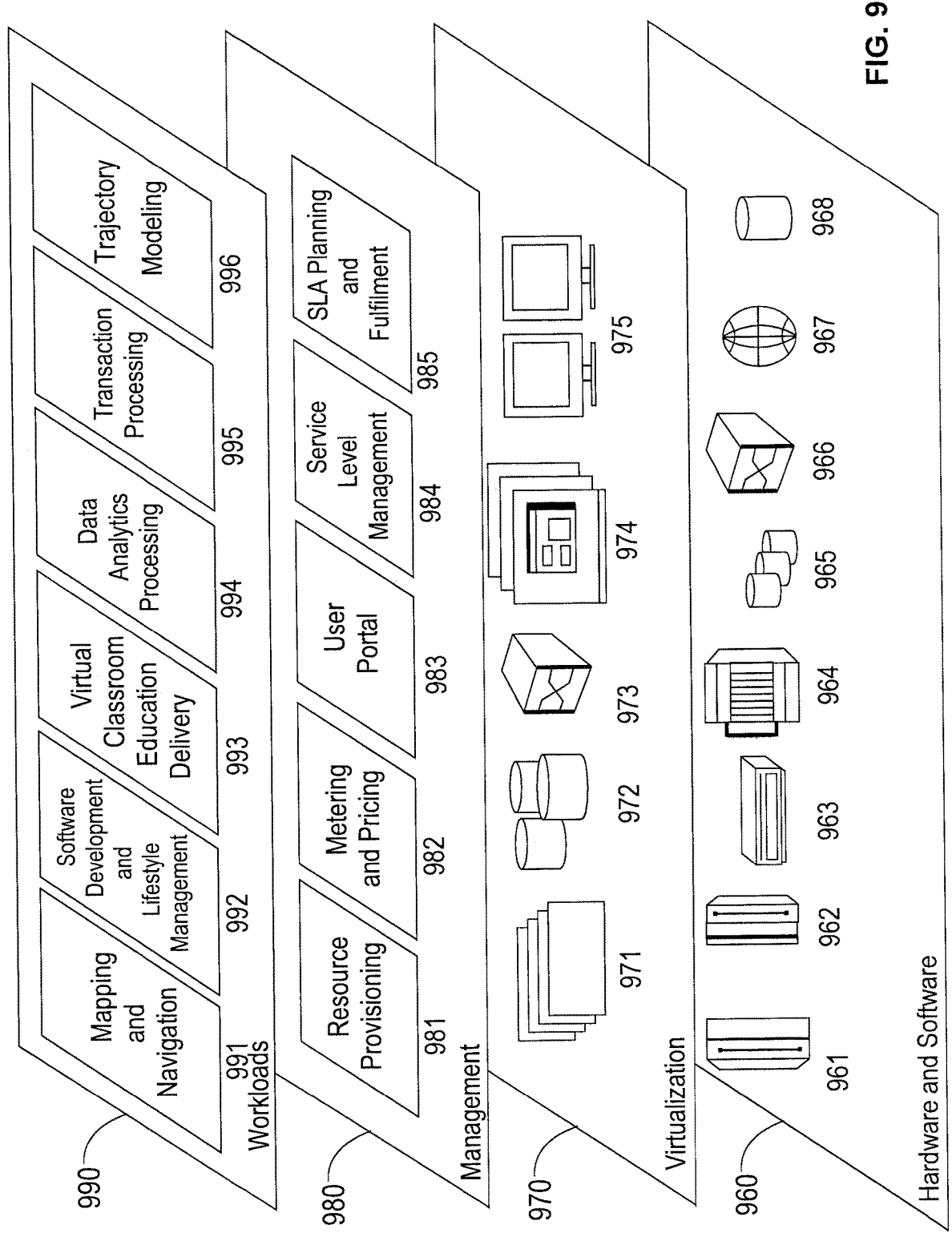
FIG. 9 is a block diagram showing a set of functional abstraction layers provided by a cloud computing environment, in accordance with an embodiment of the present invention.

Referring now to FIG. 9, a set of functional abstraction layers provided by cloud computing environment 850 (FIG. 8) is shown. It should be understood in advance that the components, layers, and functions shown in FIG. 9 are intended to be illustrative only and embodiments of the invention are not limited thereto. As depicted, the following layers and corresponding functions are provided:

Hardware and software layer 960 includes hardware and software components. Examples of hardware components include: mainframes 961; RISC (Reduced Instruction Set Computer) architecture based servers 962; servers 963; blade servers 964; storage devices 965; and networks and networking components 966. In some embodiments, software components include network application server software 967 and database software 968.

Virtualization layer 970 provides an abstraction layer from which the following examples of virtual entities may be provided: virtual servers 971; virtual storage 972; virtual networks 973, including virtual private networks; virtual applications and operating systems 974; and virtual clients 975.

In one example, management layer 980 may provide the functions described below. Resource provisioning 981 provides dynamic procurement of computing resources and other resources that are utilized to perform tasks within the cloud computing environment. Metering and Pricing 982 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 983 provides access to the cloud computing environment for consumers and system administrators. Service level management 984 provides cloud computing resource allocation and management such that required service levels are met. Service Level Agreement (SLA) planning and fulfillment 985 provide pre-arrangement for, and procurement of, cloud computing resources for which a future requirement is anticipated in accordance with an SLA.

Workloads layer 990 provides examples of functionality for which the cloud computing environment may be utilized. Examples of workloads and functions which may be provided from this layer include: mapping and navigation 991; software development and lifecycle management 992; virtual classroom education delivery 993; data analytics processing 994; transaction processing 995; and trajectory modeling for contextual POI recommendation 996.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as SMALLTALK, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Having described preferred embodiments of a system and method (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A computer-implemented method for computing a trajectory-based Point of Interest recommendation, the method comprising:
   generating, by a processor device, a set of embeddings, each of the embeddings in the set relating to a respective different trajectory contextual element of a user trajectory;
   computing, by the processor device based on the set of embeddings, an activity representation that includes a set of POI candidate embeddings;
   composing, by the processor device, a stop embedding based on the activity representation and the embeddings in the set and corresponding to a contextual element relating to one of the POI candidate embeddings in the set that represents a given stop in the user trajectory;
   computing, by the processor device, the trajectory-based POI recommendation using an attention-based, user-specific, multi-stop trajectory, Recurrent Neural Network (RNN) model applied to the stop embedding to adjust weights of the contextual element relating to the one of the POI candidate embeddings in the set that represents the given stop in the user trajectory; and
   audibly and visually providing directions to the user of a POI specified by the trajectory-based POI recommendation.

2. The computer-implemented method of claim 1, wherein said generating step comprises randomly initializing the embeddings in the set.

3. The computer-implemented method of claim 1, wherein the set of embeddings include a time embedding, a weather embedding, a static user embedding, and an item embedding.

4. The computer-implemented method of claim 1, wherein the activity representation is computed by leveraging an attention mechanism against a set of POI candidate embeddings to obtain an attention weighted average of the POI candidate embeddings as the activity representation.

5. The computer-implemented method of claim 4, wherein the attention mechanism is configured to infer a possibility of each of the POI candidate embeddings being involved in the given stop.

6. The computer-implemented method of claim 1, wherein the set of POI candidate embeddings for the given stop are predetermined from historical user data.

7. The computer-implemented method of claim 1, wherein each of the embeddings is provided to a respective different one of a plurality of hidden layers of the RNN model for activation function processing.

8. The computer-implemented method of claim 1, wherein the stop embedding comprises an activity representation for the given stop that, in turn, comprise POI candidate embeddings.

9. The computer-implemented method of claim 1, further comprising automatically placing a user vehicle into an autonomous driving mode that autonomously drives the vehicle to a POI specified by the trajectory-based POI recommendation.

10. A computer program product for computing a trajectory-based Point of Interest recommendation, the computer program product comprising a non-transitory computer readable storage medium having program instructions embodied therewith, the program instructions executable by a computer to cause the computer to perform a method comprising:
   generating, by a processor device, a set of embeddings, each of the embeddings in the set relating to a respective different trajectory contextual element of a user trajectory;
   computing, by the processor device based on the set of embeddings, an activity representation that includes a set of POI candidate embeddings;
   composing, by the processor device, a stop embedding based on the activity representation and the embeddings in the set and corresponding to a contextual element relating to one of the POI candidate embeddings in the set that represents a given stop in the user trajectory;
   computing, by the processor device, the trajectory-based POI recommendation using an attention-based, user-specific, multi-stop trajectory, Recurrent Neural Network (RNN) model applied to the stop embedding to adjust weights of the contextual element relating to the one of the POI candidate embeddings in the set that represents the given stop in the user trajectory; and
   audibly and visually providing directions to the user of a POI specified by the trajectory-based POI recommendation.

11. The computer program product of claim 10, wherein said generating step comprises randomly initializing the embeddings in the set.

12. The computer program product of claim 10, wherein the set of embeddings include a time embedding, a weather embedding, a static user embedding, and an item embedding.

13. The computer program product of claim 10, wherein the activity representation is computed by leveraging an attention mechanism against a set of POI candidate embeddings to obtain an attention weighted average of the POI candidate embeddings as the activity representation.

14. The computer program product of claim 13, wherein the attention mechanism is configured to infer a possibility of each of the POI candidate embeddings being involved in the given stop.

15. The computer program product of claim 10, wherein the set of POI candidate embeddings for the given stop are predetermined from historical user data.

16. The computer program product of claim 10, wherein each of the embeddings is provided to a respective different one of a plurality of hidden layers of the RNN model for activation function processing.

17. The computer program product of claim 10, wherein the stop embedding comprises an activity representation for the given stop that, in turn, comprise POI candidate embeddings.

18. A computer processing system for computing a trajectory-based Point of Interest recommendation, the computer processing system comprising:
   a memory for storing program code; and
   a processor device for running the program code to
      generate a set of embeddings, each of the embeddings in the set relating to a respective different trajectory contextual element of a user trajectory;
   compute, based on the set of embeddings, an activity representation that includes a set of POI candidate embeddings;
   compose a stop embedding based on the activity representation and the embeddings in the set and corresponding to a contextual element relating to one of the POI candidate embeddings in the set that represents a given stop in the user trajectory;
   compute the trajectory-based POI recommendation using an attention-based, user-specific, multi-stop trajectory, Recurrent Neural Network (RNN) model applied to the stop embedding to adjust weights of the contextual element relating to the one of the POI candidate embeddings in the set that represents the given stop in the user trajectory; and
   audibly and visually provide directions to the user of a POI specified by the trajectory-based POI recommendation.

* * * * *